United States Patent
Song et al.

(10) Patent No.: US 8,729,972 B2
(45) Date of Patent: May 20, 2014

(54) PHASE-SHIFT KEYING DEMODULATORS AND SMART CARDS INCLUDING THE SAME

(75) Inventors: Il-Jong Song, Yongin-si (KR); Sang-Hyo Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 180 days.

(21) Appl. No.: 13/242,722

(22) Filed: Sep. 23, 2011

(65) Prior Publication Data

US 2012/0207246 A1    Aug. 16, 2012

(30) Foreign Application Priority Data

Feb. 15, 2011   (KR) .......................... 10-2011-0013381

(51) Int. Cl.
*H03B 5/20*    (2006.01)

(52) U.S. Cl.
USPC ............. 331/135; 331/45; 329/304; 329/305; 329/306; 375/329

(58) Field of Classification Search
USPC .............. 329/304–306, 310; 331/45, 57, 135; 375/329
See application file for complete search history.

(56) References Cited

U.S. PATENT DOCUMENTS

| | | | |
|---|---|---|---|
| 6,075,408 A * | 6/2000 | Kullstam et al. ............... | 329/304 |
| 6,301,291 B1 | 10/2001 | Rouphael et al. | |
| 7,079,600 B2 * | 7/2006 | Byun et al. .................... | 375/334 |
| 2010/0090761 A1 | 4/2010 | Byun et al. | |

FOREIGN PATENT DOCUMENTS

| | | |
|---|---|---|
| JP | 2001-103110 | 4/2001 |
| JP | 2003522455 | 7/2003 |
| JP | 2004-159213 | 6/2004 |
| KR | 1020070102758 | 10/2007 |

OTHER PUBLICATIONS

Cheewasrirungraung et al., "A Multi-Gigabit DLL-based CMOS PWM Demodulator Using Delay Vernier Sampler," IEEE, May 2010, pp. 193-197.

* cited by examiner

*Primary Examiner* — Joseph Chang
*Assistant Examiner* — Jeffrey Shin
(74) *Attorney, Agent, or Firm* — Myers Bigel Sibley & Sajovec, P.A.

(57) ABSTRACT

A phase-shift keying (PSK) demodulator and a smart card including the same are disclosed. The PSK demodulator includes a delay circuit and a sampling circuit. The delay circuit generates a plurality of clock signals by delaying the input signal. The sampling circuit samples the input signal in response to the clock signals, and generates output data.

18 Claims, 12 Drawing Sheets

FIG. 14

| NO. of bits | data | Symbol | Phase[°] |
|---|---|---|---|
| 1 | 1 | 8 | 90 |
| | 0 | 0 | 0 |
| 2 | 11 | 8 | 90 |
| | 01 | 4 | 45 |
| | 00 | 0 | 0 |
| | 10 | -4 | -45 |
| 3 | 111 | 8 | 90 |
| | 011 | 6 | 67.5 |
| | 010 | 4 | 45 |
| | 001 | 2 | 22.5 |
| | 000 | 0 | 0 |
| | 100 | -2 | -22.5 |
| | 101 | -4 | -45 |
| | 110 | -6 | -67.5 |
| 4 | 1111 | 8 | 90 |
| | 0111 | 7 | 78.75 |
| | 0110 | 6 | 67.5 |
| | 0101 | 5 | 56.25 |
| | 0100 | 4 | 45 |
| | 0011 | 3 | 33.75 |
| | 0010 | 2 | 22.5 |
| | 0001 | 1 | 11.25 |
| | 0000 | 0 | 0 |
| | 1000 | -1 | -11.25 |
| | 1001 | -2 | -22.5 |
| | 1010 | -3 | -33.75 |
| | 1011 | -4 | -45 |
| | 1100 | -5 | -56.25 |
| | 1101 | -6 | -67.5 |
| | 1110 | -7 | -78.75 |

FIG. 15

| Symbol | Low[ns] | High[ns] | Phase[°] | Data | Hex code |
|---|---|---|---|---|---|
| -7 | 20.73 | 36.87 | -78.75 | 1110 | E |
| -6 | 23.04 | 36.87 | -67.5 | 1101 | D |
| -5 | 25.34 | 36.87 | -56.25 | 1100 | C |
| -4 | 27.65 | 36.87 | -45 | 1011 | B |
| -3 | 29.95 | 36.87 | -33.75 | 1010 | A |
| -2 | 32.26 | 36.87 | -22.5 | 1001 | 9 |
| -1 | 34.56 | 36.87 | -11.25 | 1000 | 8 |
| 0 | 36.87 | 36.87 | 0 | 0000 | 0 |
| 1 | 39.17 | 36.87 | 11.25 | 0001 | 1 |
| 2 | 41.47 | 36.87 | 22.5 | 0010 | 2 |
| 3 | 43.78 | 36.87 | 33.75 | 0011 | 3 |
| 4 | 46.08 | 36.87 | 45 | 0100 | 4 |
| 5 | 48.39 | 36.87 | 56.25 | 0101 | 5 |
| 6 | 50.69 | 36.87 | 67.5 | 0110 | 6 |
| 7 | 53.00 | 36.87 | 78.75 | 0111 | 7 |
| 8 | 55.30 | 36.87 | 90 | 1111 | F |

PHASE-SHIFT KEYING DEMODULATORS AND SMART CARDS INCLUDING THE SAME

CROSS-REFERENCE TO RELATED APPLICATION

This application claims priority under 35 U.S.C. §119 to Korean Patent Application No. 10-2011-0013381 filed on Feb. 15, 2011, the disclosure of which is hereby incorporated by reference in its entirety.

BACKGROUND

1. Field

Embodiments of the inventive concept relate to a phase-shift keying (PSK) demodulator suitable for use in a radio frequency identification (RFID) system, and a smart card including the same.

2. Description of Related Art

Phase-shift keying is a digital modulation scheme that conveys data by changing, or modulating, the phase of a reference signal. Accordingly, a PSK signal encodes data by varying the phase of the reference signal by predetermined discrete phase shifts. A PSK demodulator determines the phase of the received signal and maps it back to the symbol it represents, thus recovering the original data.

Contactless RFID systems are being used in various applications. In particular, RFID systems including a smart card that can be recognized at a distance of several centimeters are being employed in mobile communication systems. A smart card typically includes a PSK demodulator that demodulates a PSK signal transmitted from a card reader. PSK demodulation allows the smart card to detect information carried in the PSK signal.

Conventional PSK demodulators use multi-phase clocks to convert phase information into time information. For this reason, a conventional PSK demodulator uses a clock generator circuit for generating a reference signal. However, the use of a clock generator circuit may undesirably increase the complexity and/or power consumption of a PSK demodulator.

SUMMARY

Embodiments of the inventive concept provide a phase-shift keying (PSK) demodulator capable of demodulating a PSK signal using a simple circuit rather than a more complicated circuit. such as a mixer. A PSK demodulator according to some embodiments of the inventive concept may be capable of demodulating a PSK signal whose phase and period both vary.

Embodiments of the inventive concept also provide a smart card including the PSK demodulator.

The technical objectives of the inventive concept are not limited to the above disclosure; other objectives may become apparent to those of ordinary skill in the art based on the following descriptions.

In accordance with an aspect of the inventive concept, a PSK demodulator includes a delay circuit and a sampling circuit. The delay circuit generates a plurality of clock signals by delaying an input signal. The sampling circuit samples the input signal in response to the clock signals, and generates output data.

Some embodiments include a wave shaping circuit that filters the PSK signal, and limits the amplitude of the PSK signal to generate the input signal.

In some embodiments, the output data may include calibration output data output in a calibration mode, and normal output data output in a normal mode.

In some embodiments, the delay circuit may include a plurality of delay elements connected in series, and the clock signals may be output from output terminals of the respective delay elements.

In some embodiments, the delay circuit may include a plurality of buffers connected in series, and the clock signals may be output from output terminals of the respective buffers.

In some embodiments, the delay circuit may include a plurality of inverters connected in series, and the clock signals may be output from output terminals of the respective inverters.

In some embodiments, the delay circuit may include a bias unit and a delay unit.

The bias unit calibrates a bias current in response to the calibration output data, and generates a first bias voltage and a second bias voltage having a lower voltage level than the first bias voltage on the basis of the calibrated bias current. The delay unit adjusts the amount of delay in response to the first and second bias voltages, and generates the clock signals by delaying the input signal.

In some embodiments, the bias unit may include a bias current calibrator and a bias voltage supplier.

The bias current calibrator calibrates the bias current in response to the calibration output data, and the bias voltage supplier generates the first bias voltage and the second bias voltage on the basis of the calibrated bias current.

In some embodiments, the delay unit may include a plurality of delay elements connected in series, a p-channel metal oxide semiconductor (PMOS) transistor, and an n-channel metal oxide semiconductor (NMOS) transistor. The PMOS transistor provides a high power-supply voltage to the delay elements in response to the first bias voltage. The NMOS transistor provides a low power-supply voltage to the delay elements in response to the second bias voltage.

In some embodiments, the delay unit may include a plurality of delay elements connected in series, a plurality of PMOS transistors, and a plurality of NMOS transistors. The PMOS transistors separately provide a high power-supply voltage to the delay elements respectively in response to the first bias voltage. The NMOS transistors separately provide a low power-supply voltage to the delay elements respectively in response to the second bias voltage.

In some embodiments, the sampling circuit may include a plurality of flip-flops configured to sample the input signal in response to the clock signals, and generate first output data.

In some embodiments, the sampling circuit may further include an encoder configured to generate the output data by encoding the first output data.

In some embodiments, the sampling circuit may include a sampling unit, a first encoder, and a second encoder.

The sampling unit samples the input signal in response to the clock signals, and generates first output data. The first encoder generates normal output data by encoding the first output data, and the second encoder generates calibration output data by encoding the first output data.

In some embodiments, the sampling unit may include a plurality of D flip-flops.

In some embodiments, the PSK demodulator may configure one symbol using one pulse train whose phase varies, and four pulse trains whose phases do not vary.

In some embodiments, the PSK demodulator may configure one symbol using four pulse trains whose phases vary, and four pulse trains whose phases do not vary.

In some embodiments, the PSK demodulator may generate a first signal by delaying the input signal by 180 degrees and further delaying the input signal by the amount of delay of the delay elements included in the delay circuit, and generate the clock signals by inverting a phase of the first signal.

In some embodiments, the PSK demodulator may perform a calibration operation of calibrating the amount of delay of the delay circuit, and synchronizing the input signal and the clock signals until a frame of the PSK signal is input.

In some embodiments, the PSK demodulator may demodulate the PSK signal using only a phase between 0 and 90 degrees, and between 0 and −90 degrees.

In accordance with another aspect of the inventive concept, a smart card includes: a power supply circuit configured to generate a stable power supply voltage; and a PSK demodulator configured to operate from the stable power supply voltage. The PSK demodulator includes a wave shaping circuit, a delay circuit, and a sampling circuit. The wave shaping circuit filters a PSK signal, and limits the amplitude of the PSK signal to generate an input signal. The delay circuit generates a plurality of clock signals by delaying the input signal. The sampling circuit samples the input signal in response to the clock signals, and generates output data.

BRIEF DESCRIPTION OF THE DRAWINGS

The foregoing and other features and advantages of the inventive concepts will be apparent from the more particular description of preferred embodiments of the inventive concepts, as illustrated in the accompanying drawings, throughout which like reference numerals denote like elements. The drawings are not necessarily to scale, emphasis instead being placed upon illustrating the principles of the inventive concepts. In the drawings:

FIG. 14 is a table showing data, symbols, and phases according to the number of sampling bits;

FIG. 15 is a table showing symbols, codes, and logic "high" duration times and logic "low" duration times of pulse according to respective phases when the number of sampling bits is four;

DETAILED DESCRIPTION OF THE EMBODIMENTS

Figure 1:
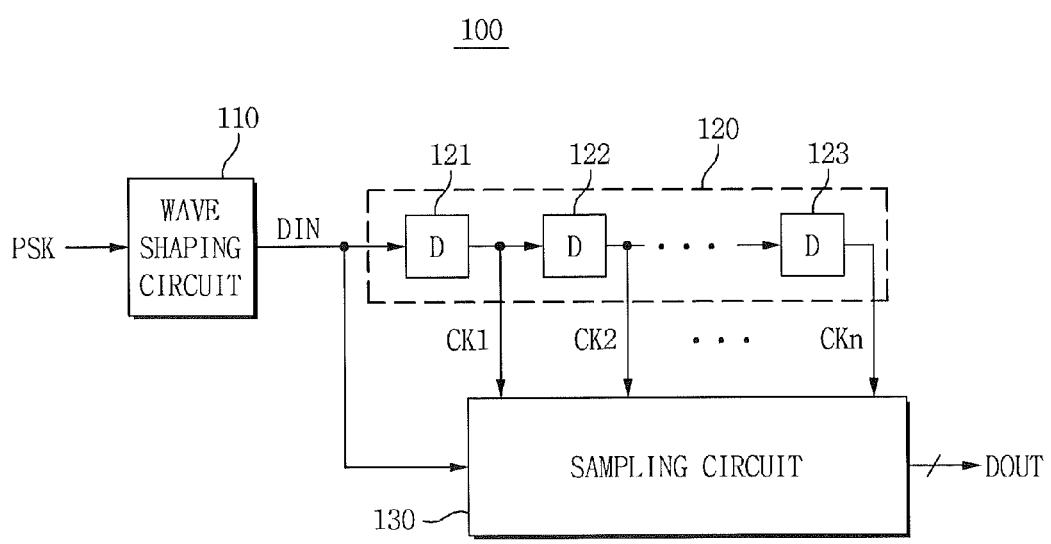
FIG. 1 is a block diagram of a phase-shift keying (PSK) demodulator according to an embodiment of the inventive concept.

A PSK demodulator according to some embodiments of the inventive concept delays an input signal using delay cells, and samples the input signal using the delayed signal. The PSK demodulator demodulates an input signal by converting phase variation of the input signal into a time variation, generates clock signals by delaying the input signal, and samples the input signal in response to the clock signals.

Accordingly, a PSK demodulator according to some embodiments of the inventive concept may demodulate a PSK signal by sensing the phase and period of the input signal without using a clock generator for generating a multi-phase clock signal. Moreover, a PSK demodulator according to some embodiments of the inventive concept can demodulate an input signal whose phase and/or period vary. For this reason, a PSK demodulator according to some embodiments of the inventive concept may have a simple circuit configuration and/or low power consumption.

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concept to those skilled in the art.

It will be understood that when an element or layer is referred to as being "on," "connected to" or "coupled with" another element or layer, it can be directly on, connected or coupled with the other element or layer or intervening elements or layers may be present. In contrast, when an element is referred to as being "directly on," "directly connected to" or "directly coupled with" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The terminology used herein is for the purpose of describing particular embodiments only and is not intended to be limiting of the inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

In some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, embodiments of the inventive concept will be described with reference to the appended drawings.

FIG. 1 is a block diagram of a phase-shift keying (PSK) demodulator 100 according to some embodiments of the inventive concept.

Referring to FIG. 1, the PSK demodulator includes a wave shaping circuit 110, a delay circuit 120, and a sampling circuit 130.

The wave shaping circuit 110 filters a PSK signal PSK, and limits the amplitude of the PSK signal PSK, thereby generating an input signal DIN. The delay circuit 120 delays the input signal DIN, thereby generating a plurality of clock signals CK1 to CKn. The sampling circuit 130 samples the input signal DIN in response to the clock signals CK1 to CKn, and generates output data DOUT. As will be described later, the output data DOUT may include calibration output data output in a calibration mode, and normal output data output in a normal mode.

The delay circuit 120 may include of a plurality of delay elements 121, 122 and 123 connected in series, and the clock signals CK1 to CKn may be output from the output terminals of the respective delay elements 121, 122 and 123.

Figure 2:
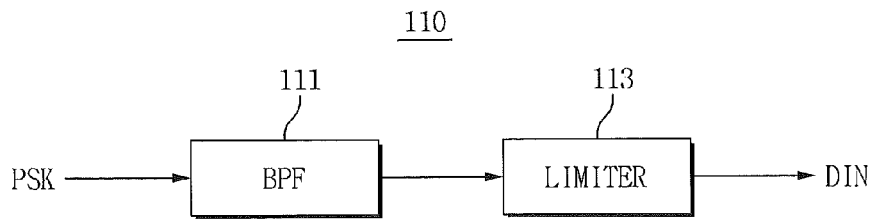
FIG. 2 is a block diagram of an example of a wave shaping circuit included in the PSK demodulator of FIG. 1.

FIG. 2 is a block diagram of an example of the wave shaping circuit 110 included in the PSK demodulator 100 of FIG. 1.

Referring to FIG. 2, the wave shaping circuit 110 may include a band-pass filter (BPF) 111 and an amplitude limiter 113. The BPF 111 band-pass filters the PSK signal PSK, and the amplitude limiter 113 limits the amplitude of the filtered PSK signal PSK and generates the input signal DIN.

Figure 3:
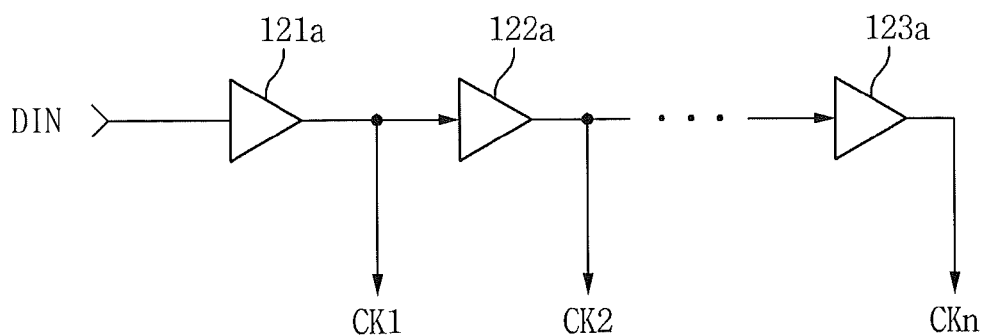
FIG. 3 is a circuit diagram of an example of a delay circuit included in the PSK demodulator of FIG. 1.

FIG. 3 is a circuit diagram of an example of a delay circuit 120 included in the PSK demodulator 100 of FIG. 1.

Referring to FIG. 3, a delay circuit 120a includes a plurality of buffers 121a, 122a and 123a connected in series. The clock signals CK1 to CKn may be output from the output terminals of the respective buffers 121a, 122a and 123a.

Figure 4:
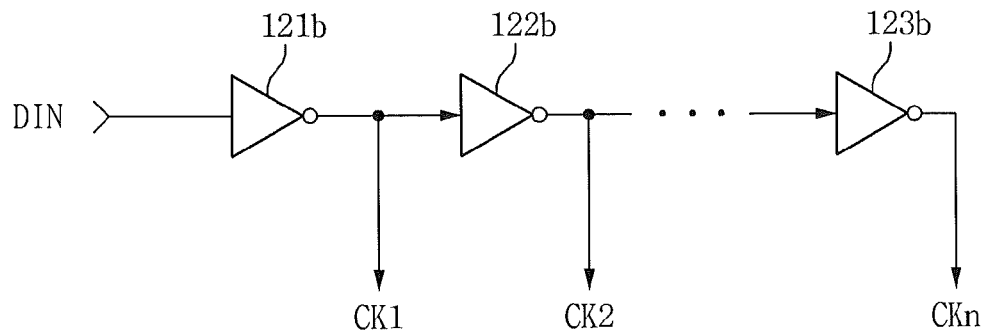
FIG. 4 is a circuit diagram of another example of the delay circuit included in the PSK demodulator of FIG. 1.

FIG. 4 is a circuit diagram of another example of the delay circuit 120 included in the PSK demodulator 100 of FIG. 1.

Referring to FIG. 4, a delay circuit 120b includes a plurality of inverters 121b, 122b and 123b connected in series. The clock signals CK1 to CKn may be output from the output terminals of the respective inverters 121b, 122b and 123b.

Figure 5:
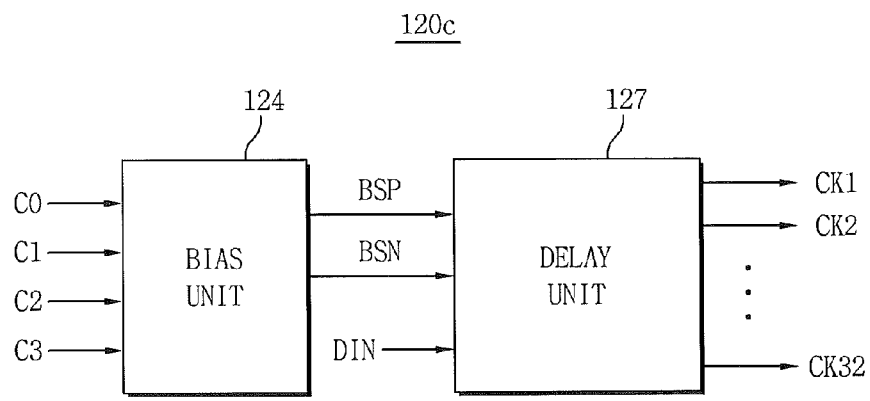
FIG. 5 is a block diagram of an example of a sampling circuit included in the PSK demodulator of FIG. 1.

FIG. 5 is a block diagram of still another example of the delay circuit 120 included in the PSK demodulator 100 of FIG. 1.

Referring to FIG. 5, a delay circuit 120c may include a bias unit 124 and a delay unit 127.

The bias unit 124 calibrates a bias current in response to calibration output data C0 to C3, and generates a first bias voltage BSP and a second bias voltage BSN having a lower voltage level than the first bias voltage BSP on the basis of the calibrated bias voltage. The delay unit 127 adjusts the amount of delay in response to the first bias voltage BSP and the second bias voltage BSN and delays the input signal DIN, thereby generating clock signals CK1 to CK32.

Figure 6:
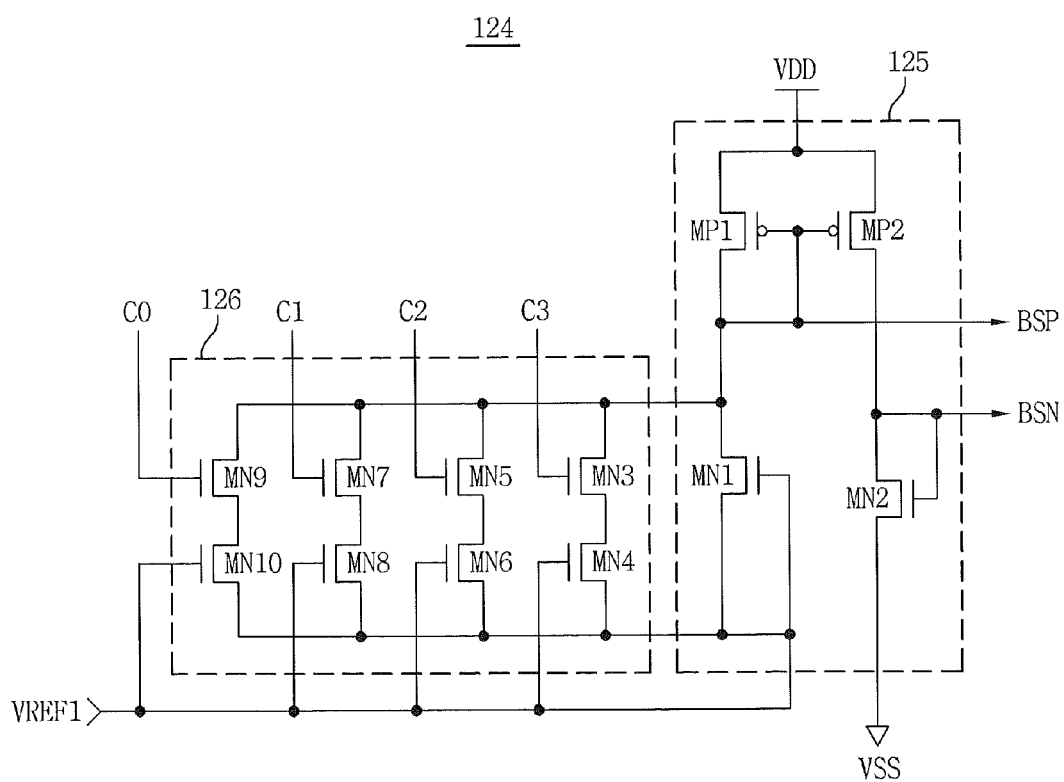
FIG. 6 is a block diagram of still another example of the delay circuit included in the PSK demodulator of FIG. 1.

FIG. 6 is a circuit diagram of an example of the bias unit 124 included in the delay circuit 120c of FIG. 5.

Referring to FIG. 6, the bias unit 124 may include a bias voltage supplier 125 and a bias current calibrator 126.

The bias current calibrator 126 calibrates the bias current in response to the calibration output data C0 to C3, and the bias voltage supplier 125 generates the first bias voltage BSP and the second bias voltage BSN on the basis of the calibrated bias current.

The bias voltage supplier 125 may include a first p-channel metal oxide semiconductor (PMOS) transistor MP1 and a second PMOS transistor MP2 that have sources connected to a high power-supply voltage VDD and are connected in the form of a current mirror, a first n-channel metal oxide semiconductor (NMOS) transistor MN1 connected to the drain of the first PMOS transistor MP1 and operating in response to a reference voltage VREF1, and a second NMOS transistor MN2 connected to the drain of the second PMOS transistor MP2 and connected in a diode configuration.

The bias current calibrator 126 may include NMOS transistors MN3 to MN10 coupled between the drain and source of the first NMOS transistor MN1. The third and fourth NMOS transistors MN3 and MN4 are connected in series and coupled between the drain and source of the first NMOS transistor MN1. The fifth and sixth NMOS transistors MN5 and MN6 are connected in series and coupled between the drain and source of the first NMOS transistor MN1. The seventh and eighth NMOS transistors MN7 and MN8 are connected in series and coupled between the drain and source of the first NMOS transistor MN1. The ninth and tenth NMOS transistors MN9 and MN10 are connected in series and coupled between the drain and source of the first NMOS transistor MN1.

The fourth NMOS transistor MN4, the sixth NMOS transistor MN6, the eighth NMOS transistor MN8, and the tenth NMOS transistor MN10 may operate in response to the reference voltage VREF1. The third NMOS transistor MN3, the fifth NMOS transistor MN5, the seventh NMOS transistor MN7, and the ninth NMOS transistor MN9 may operate in response to respective bits of the calibration output data C0 to C3.

For example, when the calibration output data C0 to C3 is "1111," the bias unit 124 may output a higher bias current than in a case where the calibration output data C0 to C3 is "0000."

Figure 7:
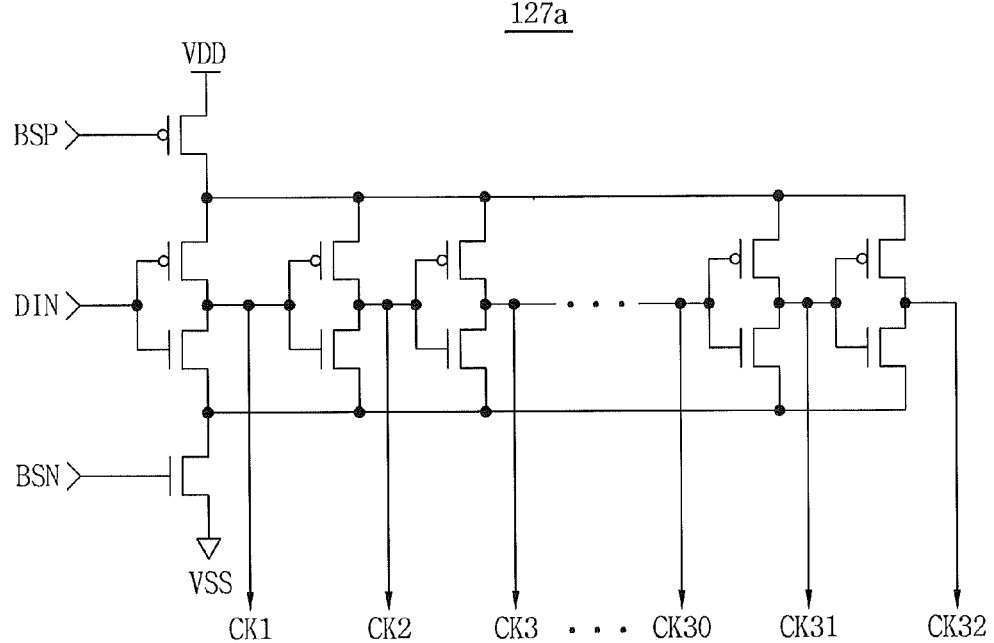
FIG. 7 is a circuit diagram of an example of a bias unit included in the delay circuit of FIG. 6.

FIG. 7 is a circuit diagram of an example of the delay unit 127 included in the delay circuit 120c of FIG. 5.

Referring to FIG. 7, a delay unit 127a may include a plurality of delay elements connected in series, a PMOS transistor, and an NMOS transistor. The PMOS transistor provides the high power-supply voltage VDD to the delay elements in response to the first bias voltage BSP. The NMOS transistor provides a low power-supply voltage VSS to the delay elements in response to the second bias voltage BSN. In FIG. 7, each of the delay elements includes an inverter including a PMOS transistor and an NMOS transistor. The input signal DIN is applied to the input terminal of a first one of the delay elements, and the clock signals CK1 to CKn are output from the output terminals of the respective delay elements.

Figure 8:
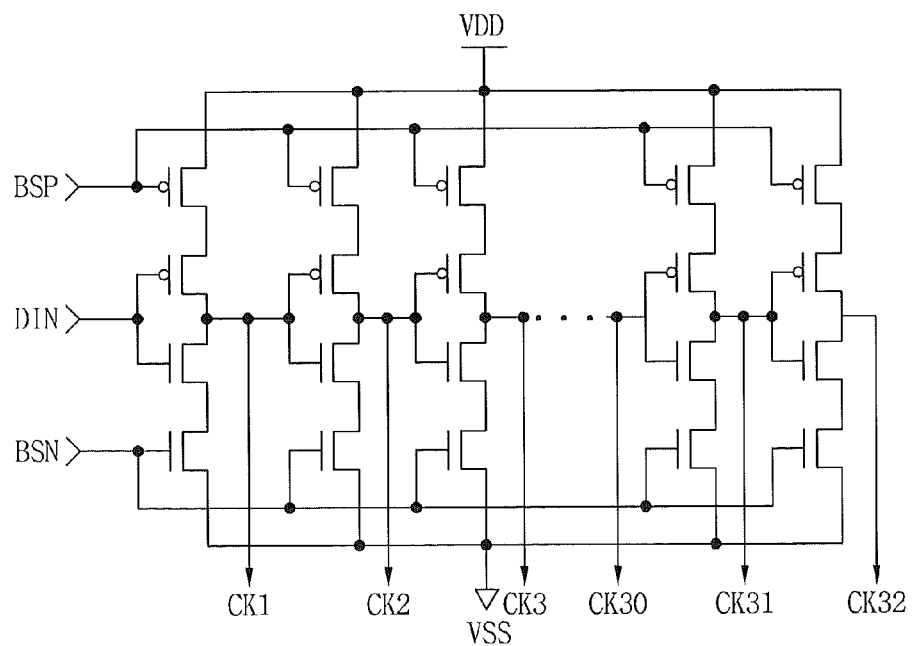
FIG. 8 is a circuit diagram of an example of a delay unit included in the delay circuit of FIG. 6.

FIG. 8 is a circuit diagram of another example of the delay unit 127 included in the delay circuit 120c of FIG. 5.

A delay unit 127b may include a plurality of delay elements connected in series, a plurality of PMOS transistors, and a plurality of NMOS transistors. The PMOS transistors separately provide the high power-supply voltage VDD to the delay elements respectively in response to the first bias voltage BSP. The NMOS transistors separately provide the low power-supply voltage VSS to the delay elements respectively in response to the second bias voltage BSN.

Figure 9:
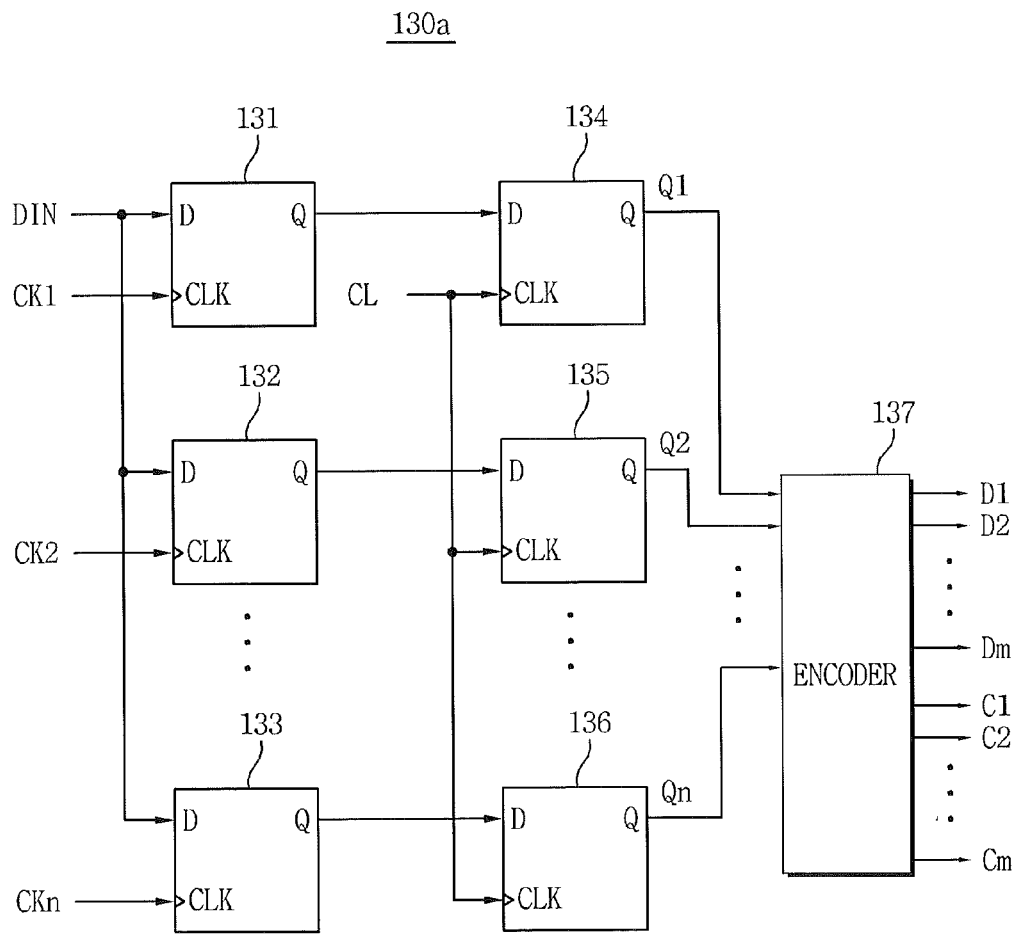
FIG. 9 is a circuit diagram of another example of the delay unit included in the delay circuit of FIG. 6.

FIG. 9 is a block diagram of an example of the sampling circuit 130 included in the PSK demodulator 100 of FIG. 1.

Referring to FIG. 9, a sampling circuit 130a may include a plurality of flip-flops 131 to 136, and an encoder 137. The flip-flops 131 to 136 sample the input signal DIN in response to the clock signals CK1 to CKn, and generate first output data Q1 to Qn. The encoder 137 encodes the first output data Q1 to Qn, thereby generating the output data DOUT. The output data DOUT may include normal output data D1 to Dm output in the normal mode, and calibration output data C1 to Cm output in the calibration mode. The number of bits of the normal output data D1 to Dm may be less than that of the first output data Q1 to Qn. The flip-flops 131 to 136 may be D flip-flops. As is well known, the output Q of a D flip-flop is a delayed version of the data D presented at the input of the flip-flop. The Q output of the D flip-flop takes the value at the D input of the flip-flop in response to a rising or falling edge (depending on the mode of operation of the flip-flop) in the clock timing signal at the CLK input of the flip-flop. When this occurs, the input data is said to be "latched" or "sampled" by the flip-flop.

The first flip-flop 131 samples the input signal DIN in response to the first clock signal CK1, the second flip-flop 132 samples the input signal DIN in response to the second clock signal CK2, and the third flip-flop 133 samples the input signal DIN in response to the nth clock signal CKn. The fourth flip-flop 134 latches the output signal of the first flip-flop 131 in response to a clear signal CL, the fifth flip-flop 135 latches the output signal of the second flip-flop 132 in response to the clear signal CL, and the sixth flip-flop 136 latches the output signal of the third flip-flop 133 in response to a clear signal CL.

Figure 10:
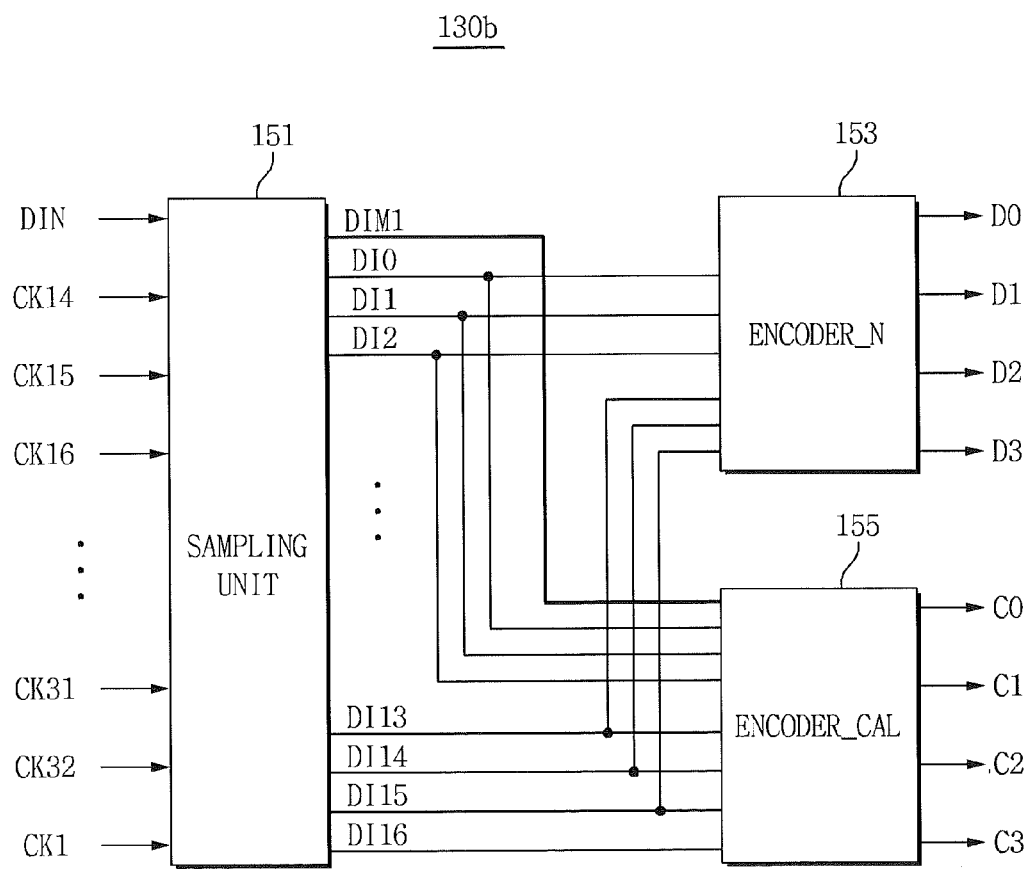
FIG. 10 is a block diagram of another example of the sampling circuit included in the PSK demodulator of FIG. 1.

FIG. 10 is a block diagram of another example of the sampling circuit 130 included in the PSK demodulator 100 of FIG. 1.

Referring to FIG. 10, a sampling circuit 130b may include a sampling unit 151, a first encoder 143, and a second encoder 155.

The sampling unit 151 samples the input signal DIN in response to the clock signals CK1 and CK14 to CK32, and generates first output data DIM1 and DI0 to DI16. The first encoder 153 generates normal output data D0 to D3 by encoding the bits DI0 to DI15 of the first output data DIM1 and DI0 to DI16, and the second encoder 155 generates the calibration output data C0 to C3 by encoding the bits DIM1 and DI0 to DI16 of the first output data DIM1 and DI0 to DI16.

As can be seen from FIG. 10, the first encoder 153 encodes 16 bits among 18 bits of the first output data DIM1 and DI0 to DI16, which is the output of the sampling unit 151, and the second encoder 155 encodes all the 18 bits of the first output data DIM1 and DI0 to DI16, which is the output of the sampling unit 151.

In the calibration mode, the calibration output data C0 to C3 is generated by the second encoder 155 and provided to the bias unit (124 of FIG. 6). The bias unit 124 calibrates a bias current in response to the calibration output data C0 to C3, and generates the first bias voltage BSP and the second bias voltage BSN having a lower voltage level than the first bias voltage on the basis of the calibrated bias current. The calibration operation continues until the first output data DIM1 and DI0 to DI16, which is the output of the sampling unit 151, becomes "18b011111111111111110." 16 bits having a value of 1 are included in a logic "high" period of a pulse signal, and two bits having a value of 0 exist out of the logic "high" period.

Figure 11:
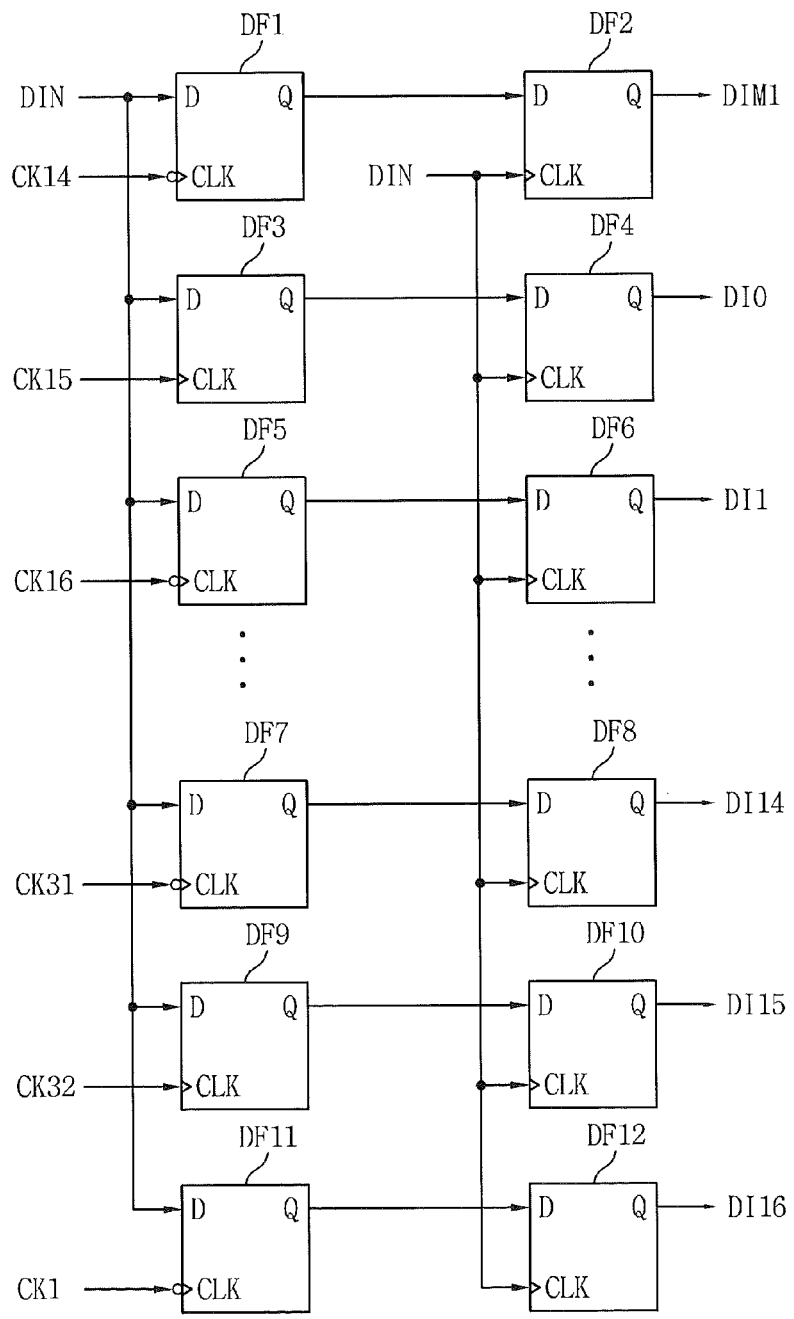
FIG. 11 is a block diagram of an example of a sampling unit included in the sampling circuit of FIG. 10.

FIG. 11 is a block diagram of an example of the sampling unit 151 included in the sampling circuit 130b of FIG. 10.

Referring to FIG. 11, the sampling unit 151 may include a plurality of D flip-flops DF1 to DF12. The sampling unit 151 samples the input signal DIN in response to the clock signals CK14 to CK32, and generates the first output data Q1 to Qn. The D flip-flops DF1, DF3, DF5, DF7, DF9 and DF11 sample the input signal DIN in response to the clock signals CK1 and CK14 to CK32, and the D flip-flops DF2, DF4, DF6, DF7, DF10 and DF12 latch the output signals of the D flip-flops DF1, DF3, DF5, DF7, DF9 and DF11 in response to the input signal DIN. In FIG. 11, the input signal DIN is used as the clear signal (CL of FIG. 9).

FIGS. 12A to 12D are timing diagrams illustrating demodulation methods of the PSK demodulator 100 of FIG. 1. FIGS. 12A to 12D illustrate methods of configuring a symbol using one pulse train whose phase may vary, and four pulse trains whose phases do not vary.

Figure 12A:
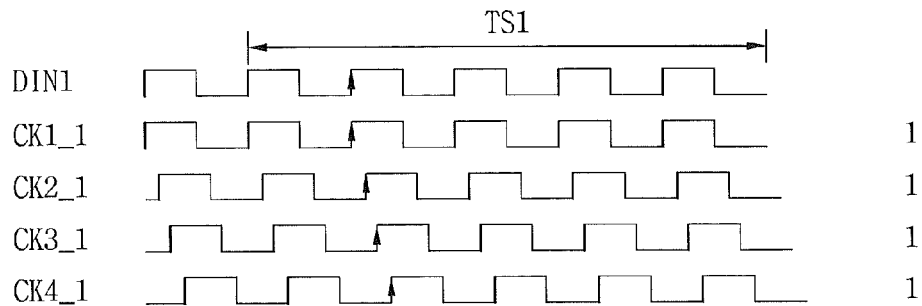
FIGS. 12A and 12D are timing diagrams illustrating a demodulation method of the PSK demodulator of FIG. 1.
Figure 12B:
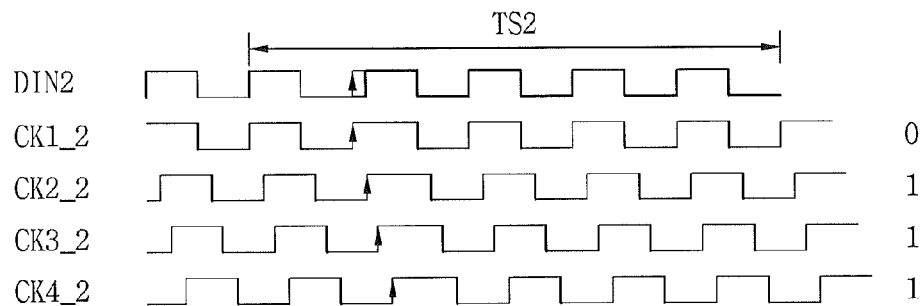
Figure 12C:
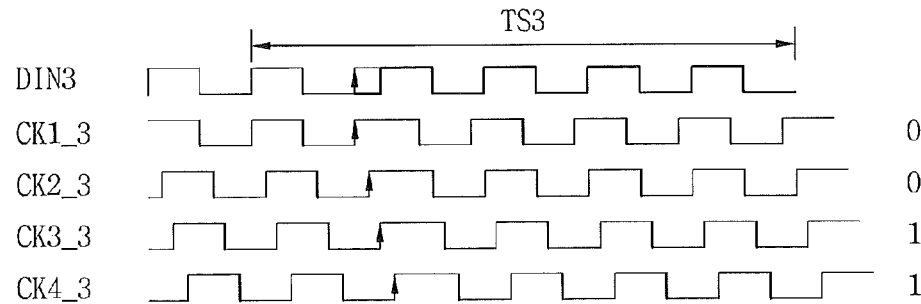
Figure 12D:
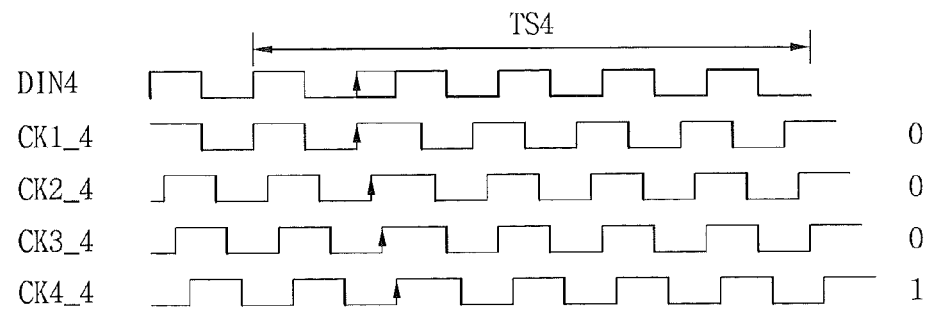

In particular, FIG. 12A is a timing diagram illustrating methods of sampling an input signal DIN1 whose phase does not vary, and FIGS. 12B to 12D are timing diagrams illustrating methods of sampling input signals DIN2 to DIN4 whose phases vary.

When the phase of an input signal does not vary as shown in FIG. 12A, and the period of the input signal DIN is TC, a sampling time TS1 for configuring one symbol becomes 4×TC. In the case of FIG. 12B, a sampling time TS2 for configuring one symbol becomes (4+⅛)×TC. In the case of FIG. 12C, a sampling time TS3 for configuring one symbol becomes (4+¼)×TC, and in the case of FIG. 12D, a sampling time TS4 for configuring one symbol becomes (4+⅜)×TC.

In FIG. 12A, all pulses included in a pulse train included in the sampling time TS1 for configuring one symbol have the same logic "high" duration time and the same logic "low" duration time.

In FIG. 12B, a first pulse of a pulse train included in the sampling time TS2 for configuring one symbol has the same logic "high" duration time as other pulses in the pulse train, but a longer logic "low" duration time than the other pulses in the pulse train by ⅛×TC.

In FIG. 12C, a first pulse of a pulse train included in the sampling time TS3 for configuring one symbol has the same logic "high" duration time as other pulses in the pulse train, but a longer logic "low" duration time than the other pulses in the pulse train by ¼×TC.

In FIG. 12D, a first pulse of a pulse train included in the sampling time TS4 for configuring one symbol has the same logic "high" duration time as other pulses in the pulse train, but a longer logic "low" duration time than the other pulses in the pulse train by ⅜×TC.

As described above, clock signals are generated by delaying the input signal DIN in a PSK demodulator according to embodiments of the inventive concept. In FIG. 12A, clock signals CK1_1, CK2_1, CK3_1 and CK4_1 have different delays, and a result of sampling the input signal DIN1 in response to the clock signals CK1_1, CK2_1, CK3_1 and CK4_1 is "1111" as shown on the right side of FIG. 12A. In FIG. 12B, clock signals CK1_2, CK2_2, CK3_2 and CK4_2 are generated by delaying the input signal DIN2 by 180 degrees, further delaying the delayed input signal for the delays of respective delay elements, and inverting the further-delayed input signal, and a result of sampling the input signal DIN2 in response to the clock signals CK1_2, CK2_2, CK3_2 and CK4_2 is "0111" as shown on the right side of FIG. 12B. In FIG. 12C, clock signals CK1_3, CK2_3, CK3_3 and CK4_3 are generated by delaying the input signal DIN3 by 180 degrees, further delaying the delayed input signal for the delays of the respective delay elements, and inverting the further-delayed input signal, and a result of sampling the input signal DIN3 in response to the clock signals CK1_3, CK2_3, CK3_3 and CK4_3 is "0011" as shown on the right side of FIG. 12C. In FIG. 12D, clock signals CK1_4, CK2_4, CK3_4 and CK4_4 are generated by delaying the input signal DIN4 by 180 degrees, further delaying the delayed input signal for the delays of the respective delay elements, and inverting the further-delayed input signal, and a result of sampling the input signal DIN4 in response to the clock signals CK1_4, CK2_4, CK3_4 and CK4_4 is "0001" as shown on the right side of FIG. 12D.

As described above with reference to FIG. 9, data sampled by flip-flops may be encoded by an encoder. For example, the sampling result of FIG. 12A, "1111," the sampling result of FIG. 12B, "0111," the sampling result of FIG. 12C, "0011," and the sampling result of FIG. 12D, "0001", may be encoded into the data values "11," "01," "00," and "10," respectively.

Figure 13:
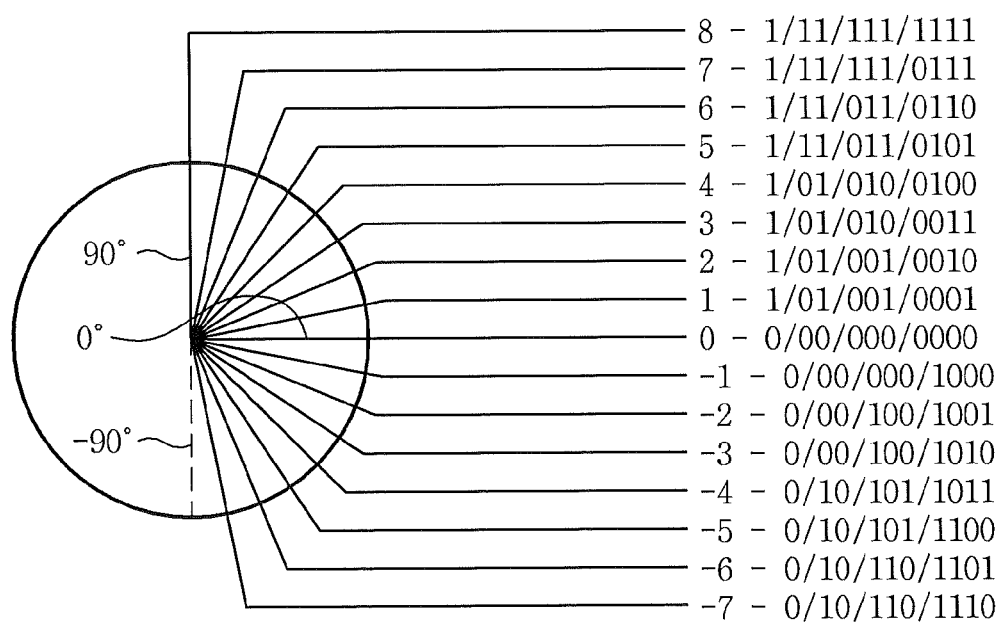
FIG. 13 is a diagram illustrating a method of mapping data having information to a phase.

FIG. 13 is a diagram illustrating methods of mapping data having information to a phase, and FIG. 14 is a table showing data, symbols, and phases according to the number of sampling bits. In FIG. 13, 16 pieces of data are shown using only phases between −90 and 90 degrees.

Referring to FIGS. 13 and 14, a phase of 0 degree may be denoted by a symbol "0," a phase of 11.25 degrees may be denoted by a symbol "1," a phase of 22.5 degrees may be denoted by a symbol "2," a phase of 33.75 degrees may be denoted by a symbol "3," a phase of 45 degrees may be denoted by a symbol "4," a phase of 56.25 degrees may be denoted by a symbol "5," a phase of 67.5 degrees may be denoted by a symbol "6," a phase of 78.75 degrees may be denoted by a symbol "7," and a phase of 90 degrees may be denoted by a symbol "8." Also, a phase of −11.25 degrees may be denoted by a symbol "−1," a phase of −22.5 degrees may be denoted by a symbol "−2," a phase of −33.75 degrees may be denoted by a symbol "−3," a phase of −45 degrees may be denoted by a symbol "−4," a phase of −56.25 degrees may be denoted by a symbol "−5," a phase of −67.5 degrees may be denoted by a symbol "−6," and a phase of −78.75 degrees may be denoted by a symbol "−7."

The phase of 0 degree may be denoted by 1-bit data of "0," 2-bit data of "00," 3-bit data of "000," and 4-bit data of "0000." The phase of 90 degrees may be denoted by 1-bit data of "1," 2-bit data of "11," 3-bit data of "111," and 4-bit data of "1111." The other phases also may be denoted by data shown in FIGS. 13 and 14.

Accordingly, the number of bits that can be encoded in a single phase shift of the input signal is limited by the resolution of the PSK demodulator, which is in determined by the number of sampling bits used to demodulate the PSK signal.

FIG. 15 is a table showing symbols, codes, and logic "high" duration times and logic "low" duration times of pulse according to respective phases when the number of sampling bits is four.

As described above with reference to FIGS. 12A to 12D, the logic "high" duration time of a pulse of an input signal used in a PSK demodulator according to embodiments of the inventive concept does not vary, and only the logic "low" duration time varies. In other words, information may only be included in the logic "low" period of an input signal, that is, a PSK signal, used in a PSK demodulator according to embodiments of the inventive concept.

Referring to FIG. 15, as a phase varies, the logic "high" duration time of the pulse does not vary from 36.87 ns, but the logic "low" duration time varies. When the phase varies by 11.25 degrees, the logic "low" duration time of an input signal varies by 2.3 ns (=36.87/16). Accordingly, phase shifts can be indicated by the logic "low" duration time of an input signal.

In FIG. 15, phase variations are expressed by hexadecimal codes. For example, the phase of 0 degree may be denoted by a code "0," the phase of 11.25 degrees may be denoted by a code "1," the phase of 22.5 degrees may be denoted by a code "2," the phase of 33.75 degrees may be denoted by a code "3," the phase of 45 degrees may be denoted by a code "4," the phase of 56.25 degrees may be denoted by a code "5," the phase of 67.5 degrees may be denoted by a code "6," the phase of 78.75 degrees may be denoted by a code "7," and the phase of 90 degrees may be denoted by a code "F." Also, the phase of −11.25 degrees may be denoted by a code "8," the phase of −22.5 degrees may be denoted by a code "9," the phase of −33.75 degrees may be denoted by a code "A," the phase of −45 degrees may be denoted by a code "B," the phase of −56.25 degrees may be denoted by a code "C," the phase of −67.5 degrees may be denoted by a code "D," and the phase of −78.75 degrees may be denoted by a code "E."

Figure 16:
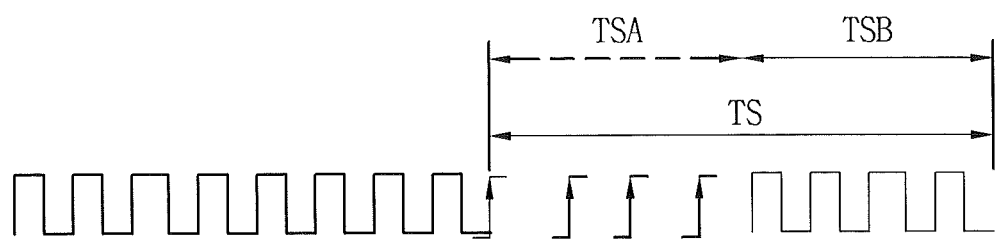
FIG. 16 is a diagram illustrating an example of a method of configuring a symbol using a pulse train of a pulse signal.

FIG. 16 is a diagram illustrating an example of methods of configuring a symbol using a pulse train of a pulse signal.

Referring to FIG. 16, a PSK demodulator according to embodiments of the inventive concept may configure one symbol using four pulse trains whose phases vary, and four pulse trains whose phases do not vary. A sampling time TS for configuring one symbol is the sum of a sampling time TSA in which the four pulse trains whose phases vary are used, and a sampling time TSB in which the four pulse trains whose phases do not vary are used.

Figure 17:
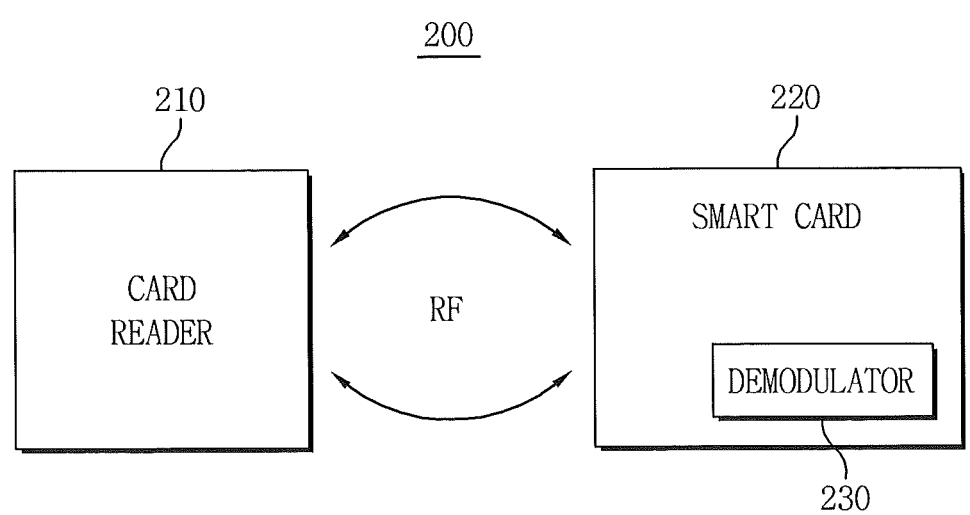
FIG. 17 is a block diagram of an example of a radio frequency identification (RFID) system having a PSK demodulator according to embodiments of the inventive concept.

FIG. 17 is a block diagram of an example of a radio frequency identification (RFID) system 200 having a PSK demodulator according to embodiments of the inventive concept.

Referring to FIG. 17, the RFID system 200 includes a card reader 210 and a smart card 220. The card reader 210 supplies the smart card 220 with energy and receives data from the smart card 220. Also, the card reader 210 phase-modulates a PSK signal and wirelessly transmits the phase-modulated PSK signal to the smart card 220 through an antenna (not shown). The smart card 220 includes a power supply circuit (not shown) that generates a stable power-supply voltage, a memory (not shown) that can store data, and a PSK demodulator 230. The PSK demodulator 230 operates from the stable power-supply voltage, and demodulates the received PSK signal.

A PSK demodulator according to embodiments of the inventive concept may perform a calibration operation of calibrating the amount of delay of a delay circuit and synchronizing an input signal and the clock signals until a frame of the PSK signal is input. When the operation of calibrating the amount of delay of the delay circuit is finished, the input signal is delayed to generate the clock signals and sampled in response to the clock signals, and sampled data is encoded. The data demodulated by the PSK demodulator may be provided to a digital signal processing circuit.

As described above, a PSK demodulator according to embodiments of the inventive concept demodulates an input signal by converting a phase variation into a time variation, generates clock signals by delaying the input signal, and samples the input signal in response to the clock signals. Thus, the PSK demodulator according to embodiments of the inventive concept can readily demodulate even an input signal whose phase and period vary, and demodulates a PSK signal by sensing the phase and period of the input signal without using a clock generator for generating a multi-phase clock signal. For this reason, the PSK demodulator according to embodiments of the inventive concept has a simple circuit and low power consumption. A semiconductor chip including the PSK demodulator according to embodiments of the inventive concept is small in size and low in production cost.

Embodiments of the inventive concept can be applied to a smart card and RFID system using a PSK demodulator.

The foregoing is illustrative of embodiments and is not to be construed as limiting thereof. Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures. Therefore, it is to be understood that the foregoing is illustrative of various embodiments and not to be construed as limiting of the inventive concept to the specific embodiments disclosed, and that modifications to the disclosed embodiments, as well as other embodiments, are intended to be included within the scope of the appended claims.

What is claimed is:

1. A phase-shift keying (PSK) demodulator for demodulating an input signal, comprising:
   a delay circuit configured to generate a plurality of clock signals by delaying the input signal of the PSK demodulator; and
   a sampling circuit configured to sample the input signal in response to the clock signals, and to generate output data;
   wherein the delay circuit comprises:
   a bias unit configured to calibrate a bias current in response to calibration output data, and generate a first bias voltage and a second bias voltage having a lower voltage level than the first bias voltage on the basis of the calibrated bias current; and
   a delay unit configured to adjust an amount of delay in response to the first and second bias voltages, and generate the clock signals by delaying the input signal.

2. The PSK demodulator of claim 1, further comprising a wave shaping circuit configured to filter a PSK signal, and limit an amplitude of the PSK signal to generate the input signal.

3. The PSK demodulator of claim 1, wherein the delay circuit comprises a plurality of delay elements connected in series, and
   wherein the clock signals are output from output terminals of the respective delay elements.

4. The PSK demodulator of claim 1, wherein the bias unit comprises:
   a bias current calibrator configured to calibrate the bias current in response to the calibration output data; and
   a bias voltage supplier configured to generate the first bias voltage and the second bias voltage on the basis of the calibrated bias current.

5. The PSK demodulator of claim 1, wherein the delay unit comprises:
   a plurality of delay elements connected in series;
   a p-channel metal oxide semiconductor (PMOS) transistor configured to provide a high power-supply voltage to the delay elements in response to the first bias voltage; and
   an n-channel metal oxide semiconductor (NMOS) transistor configured to provide a low power-supply voltage to the delay elements in response to the second bias voltage.

6. The PSK demodulator of claim 1, wherein the sampling circuit comprises a plurality of flip-flops configured to sample the input signal in response to the clock signals, and generate first output data.

7. The PSK demodulator of claim 6, wherein the sampling circuit further comprises an encoder configured to generate the output data by encoding the first output data.

8. A phase-shift keying (PSK) demodulator for demodulating an input signal, comprising:
   a delay circuit configured to generate a plurality of clock signals by delaying the input signal of the PSK demodulator; and
   a sampling circuit configured to sample the input signal in response to the clock signals, and to generate output data;
   wherein the sampling circuit comprises:
   a sampling unit configured to sample the input signal in response to the clock signals, and generate first output data;
   a first encoder configured to generate normal output data by encoding the first output data; and
   a second encoder configured to generate calibration output data by encoding the first output data.

9. A phase-shift keying (PSK) demodulator for demodulating an input signal, comprising:
   a delay circuit configured to generate a plurality of clock signals by delaying the input signal of the PSK demodulator; and
   a sampling circuit configured to sample the input signal in response to the clock signals, and to generate output data;
   wherein one symbol is configured using one pulse train whose phase varies, and four pulse trains whose phases do not vary.

10. A phase-shift keying (PSK) demodulator for demodulating an input signal, comprising:
    a delay circuit configured to generate a plurality of clock signals by delaying the input signal of the PSK demodulator; and
    a sampling circuit configured to sample the input signal in response to the clock signals, and to generate output data;
    wherein one symbol is configured using four pulse trains whose phases vary, and four pulse trains whose phases do not vary.

11. The PSK demodulator of claim 1, wherein the input signal is delayed by 180 degrees and further delayed by an amount of delay of delay elements comprised in the delay circuit to generate a first signal, and
    the clock signals are generated by inverting a phase of the first signal.

12. The PSK demodulator of claim 1, wherein a calibration operation of calibrating an amount of delay of the delay circuit and synchronizing the input signal and the clock signals is performed until a frame of the PSK signal is input.

13. The PSK demodulator of claim 1, wherein the PSK signal is demodulated by converting a phase variation into a time variation.

14. A smart card, comprising:
    a power supply circuit configured to generate a stable power supply voltage; and
    a phase-shift keying (PSK) demodulator configured to operate from the stable power supply voltage,
    wherein the PSK demodulator comprises:

a wave shaping circuit configured to filter a PSK signal, and limit an amplitude of the PSK signal to generate an input signal;

a delay circuit configured to generate a plurality of clock signals by delaying the input signal of the PSK demodulator; and a sampling circuit configured to sample the input signal in response to the clock signals, and generate output data;

wherein the sampling circuit comprises:

a sampling unit configured to sample the input signal in response to the clock signals, and generate first output data;

a first encoder configured to generate normal output data by encoding the first output data; and a second encoder configured to generate calibration output data by encoding the first output data.

15. A phase-shift keying (PSK) demodulator for demodulating an input signal, comprising:

a delay circuit configured to generate a plurality of clock signals by delaying the input signal of the PSK demodulator;

a sampling circuit configured to sample the input signal in response to the respective clock signals, and to generate output data; and a detector configured to detect changes in phase of the input signal in response to the output data;

wherein the delay circuit comprises:

a bias unit configured to calibrate a bias current in response to calibration output data, and generate a first bias voltage and a second bias voltage having a lower voltage level than the first bias voltage on the basis of the calibrated bias current; and a delay unit configured to adjust an amount of delay in response to the first and second bias voltages, and generate the clock signals by delaying the input signal.

16. The PSK demodulator of claim 15, wherein the delay circuit comprises a plurality of delay elements connected in series, and wherein the clock signals are output from output terminals of the respective delay elements.

17. The PSK demodulator of claim 15, wherein the sampling circuit comprises a plurality of flip-flops configured to sample the input signal in response to the clock signals, and generate first output data.

18. The PSK demodulator of claim 17, wherein the sampling circuit further comprises an encoder configured to generate the output data by encoding the first output data.

* * * * *